US012560676B2

(12) United States Patent
Lvov

(10) Patent No.: US 12,560,676 B2
(45) Date of Patent: Feb. 24, 2026

(54) PROXIMITY SENSING

(71) Applicant: DSP Group Ltd., Herzliya (IL)

(72) Inventor: Dmitri Lvov, Ramat Hasharon (IL)

(73) Assignee: DSP Group Ltd., Herzliya (IL)

( * ) Notice: Subject to any disclaimer, the term of this patent is extended or adjusted under 35 U.S.C. 154(b) by 117 days.

(21) Appl. No.: 16/812,368

(22) Filed: Mar. 9, 2020

(65) Prior Publication Data

US 2020/0292656 A1     Sep. 17, 2020

Related U.S. Application Data

(60) Provisional application No. 62/841,388, filed on May 1, 2019, provisional application No. 62/816,247, filed on Mar. 11, 2019.

(51) Int. Cl.
| | |
|---|---|
| *G01S 15/10* | (2006.01) |
| *G01S 5/30* | (2006.01) |
| *G01S 7/524* | (2006.01) |
| *G01S 11/16* | (2006.01) |
| *G01S 15/931* | (2020.01) |

(52) U.S. Cl.
CPC .............. *G01S 5/30* (2013.01); *G01S 7/524* (2013.01); *G01S 11/16* (2013.01); *G01S 15/10* (2013.01); *G01S 15/931* (2013.01)

(58) Field of Classification Search
CPC . G01S 5/30; G01S 7/524; G01S 11/16; G01S 15/10; G01S 15/931
See application file for complete search history.

(56) References Cited

U.S. PATENT DOCUMENTS

| | | | | | |
|---|---|---|---|---|---|
| 9,846,233 | B2* | 12/2017 | Yu | .......................... | A47L 9/2826 |
| 9,993,225 | B2* | 6/2018 | McMorrow | ......... | G01S 7/52036 |
| 10,459,579 | B2* | 10/2019 | Dahl | ....................... | G06F 3/017 |
| 2002/0147398 | A1* | 10/2002 | Kawagishi | .......... | G01S 15/8952 |
| | | | | | 600/458 |
| 2011/0281319 | A1* | 11/2011 | Swayze | .................. | C12M 47/04 |
| | | | | | 435/173.9 |
| 2016/0084957 | A1* | 3/2016 | Krug | ..................... | G01S 15/101 |
| | | | | | 701/96 |

(Continued)

FOREIGN PATENT DOCUMENTS

| | | | |
|---|---|---|---|
| JP | H04346092 A | * | 12/1992 |
| JP | 2018179782 A | * | 11/2018 |

*Primary Examiner* — Abdallah Abulaban
(74) *Attorney, Agent, or Firm* — Paradice & Li LLP

(57) ABSTRACT

There may be provided a method for proximity sensing by a computerized device, the method may include transmitting, by at least one transmitter of a computerized device and during at least one transmission window, one or more transmitted signals, the one or more transmitted signals comprise a transmitted ultrasonic signal; operating at least one receiver of the computerized device to receive, during at least one reception window, one or more received signals that were reflected or scattered due to the transmitting; processing the received signals to provide a processing result, when receiving the received signals by the receiver during the at least one reception window; and determining a proximity of one or more objects to the computerized device based on at least one out of (a) an absence of received signals during the at least one receive window, and (b) the processing results.

14 Claims, 2 Drawing Sheets

100

(56) References Cited

U.S. PATENT DOCUMENTS

| | | | | |
|---|---|---|---|---|
| 2016/0323672 A1* | 11/2016 | Bhogal | .................... | H04R 5/04 |
| 2017/0000553 A1* | 1/2017 | Wiener | .............. | A61B 18/1445 |
| 2018/0031684 A1* | 2/2018 | Horishita | ................ | G01S 7/521 |
| 2019/0102046 A1* | 4/2019 | Miranto | .............. | G01S 7/52026 |
| 2019/0365348 A1* | 12/2019 | Toume | .................. | A61B 8/065 |

* cited by examiner

Figure 1:
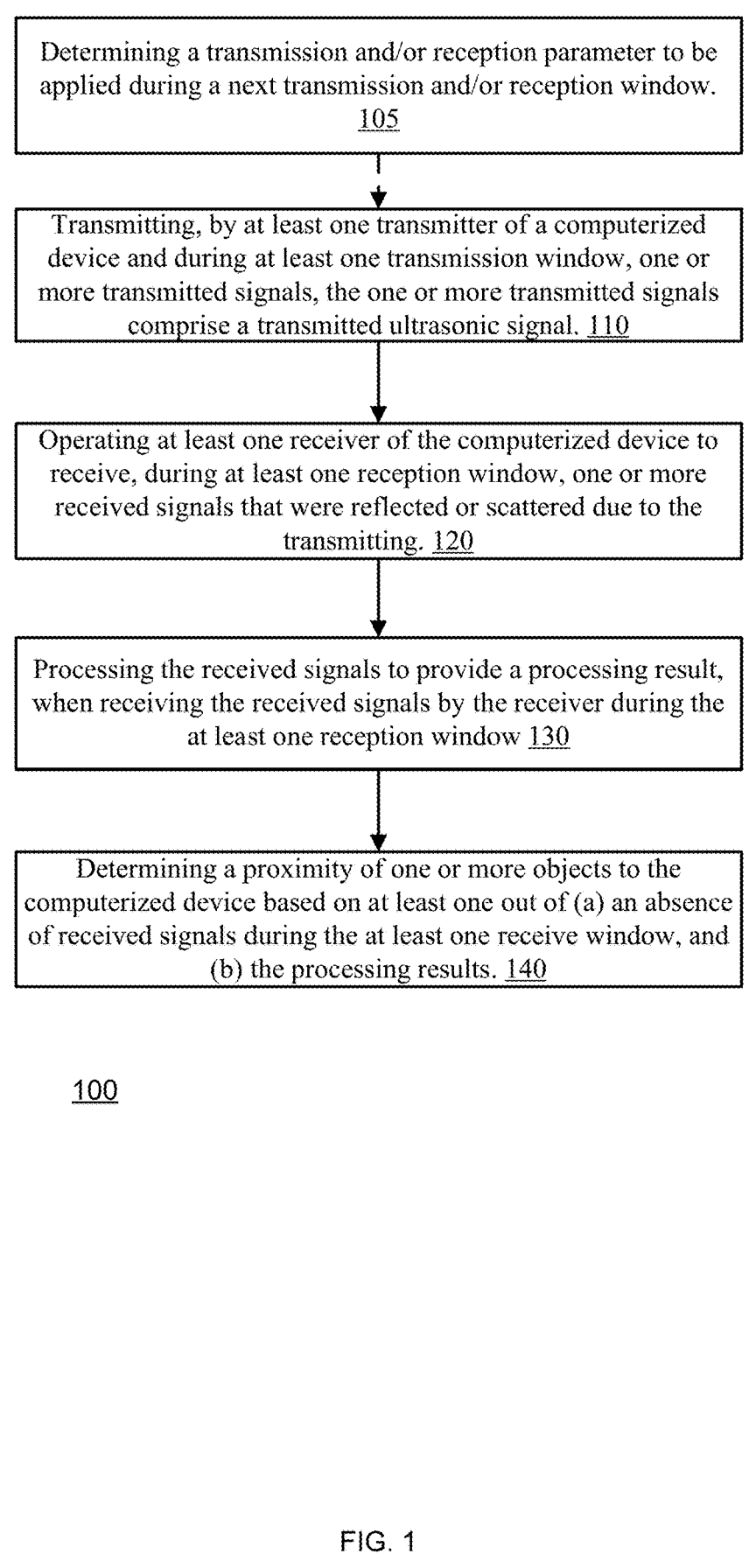

Determining a transmission and/or reception parameter to be applied during a next transmission and/or reception window. 105

Transmitting, by at least one transmitter of a computerized device and during at least one transmission window, one or more transmitted signals, the one or more transmitted signals comprise a transmitted ultrasonic signal. 110

Operating at least one receiver of the computerized device to receive, during at least one reception window, one or more received signals that were reflected or scattered due to the transmitting. 120

Processing the received signals to provide a processing result, when receiving the received signals by the receiver during the at least one reception window 130

Determining a proximity of one or more objects to the computerized device based on at least one out of (a) an absence of received signals during the at least one receive window, and (b) the processing results. 140

At least one transmitter
210

At least one receiver
220

At least one processing
circuit  230

200

PROXIMITY SENSING

CROSS REFERENCE

The application claims priority from U.S. provisional patent 62/816,247 filing date Mar. 11, 2019 which is incorporated herein by reference.

The application claims priority from U.S. provisional patent 62/841,388 filing date May 1, 2019 which is incorporated herein by reference.

BACKGROUND

There is a growing need to perform proximity sensing.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 illustrates method for proximity sensing by a computerized device.

DETAILED DESCRIPTION OF THE DRAWINGS

Figure 2:
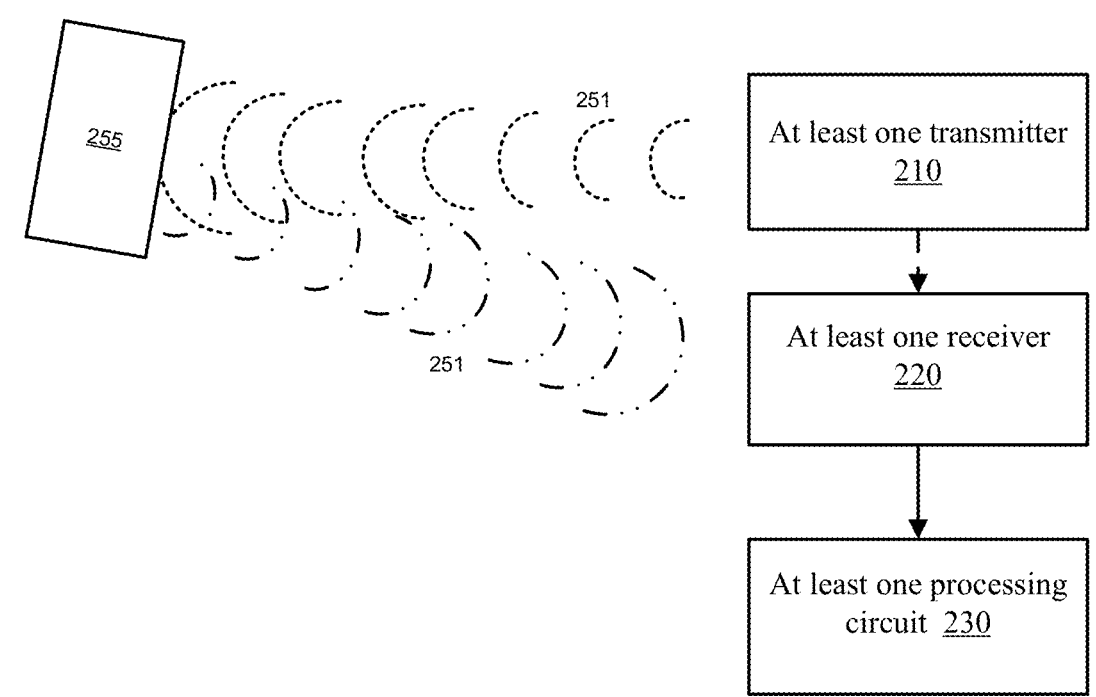
FIG. 2 illustrates a computerized device that includes at least one transmitter, at least one receiver, and at least one processing circuit.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The terms receivers and sensors are used in an interchangeable manner.

A device (for example an earphone, a mobile device, and the like) may include an ultrasonic transmitter and an ultrasonic receiver.

It should be noted that the suggested method and device may be applied mutatis mutandis for a transmission by one or more transmitters and/or to a reception by one or more receivers.

Proximity sensing may include transmitting an ultrasonic signal from a speaker (that may be included in an earpiece). The speaker can be designed for ultrasonic transmission (the speaker may be designed mainly for ultrasonic transmission—or may be designed mainly for audible frequency transmission but may still transmit in the ultrasonic range).

A microphone receives the ultrasonic transmission.

Due to reflections or other physical effects, the received ultrasonic signal changes in presence of a close object, producing a received ultrasonic signal.

This ultrasonic signal change, and the received ultrasonic signal itself in both cases, near and/or far, is different for different devices units, even of the same product model.

The received ultrasonic microphone signal may be analyzed to detect the presence of a close object.

The proximity detection may include processing the received ultrasonic signal using signal processing processes, with or without neural networks.

In signal processing some features of the received ultrasonic signal in the relevant frequency band may be extracted.

Neural Network—The signal features are classified to "far" and "near" cases

The processing may include at least one out of:

a. Using a combination of signal processing and a neural network for the task. The signal processing may be used to extract relevant features from the raw signal and/or for post-processing of the outputs of the neural network.

b. Utilize not only the received signal, but also the sent (transmitted) signal. Since we know exactly what signal is being emitted from the speaker, this signal may be utilized, for example for channel estimation, as commonly done in echo cancellation tasks.

c. Transmit the US signal continuously and not in time intervals.

d. Transmit a band limited ultrasonic noise signal, as opposed to signals common in radars. An example for such a signal may be a band-limited white noise, which is a result of filtering a white noise by a band-pass filter.

e. Detecting not only proximity, but also positioning—e.g. phone placed on a table facing upwards or downwards. Depending on the application, the position, or the physical orientation, of the device may be relevant both for proximity sensing, and for interaction with the user. For example, a smartphone may require to be very sensitive to proximity when hand held but much less sensitive when placed on a table facing upward.

For example—the transmitted ultrasound signal may a sine tone, a sweep/chirp—or another signal—such as but not limited to a signal that is spread around the spectrum—such as a band limited white noise.

The frequency of the ultrasonic signal may exceed 20 Kh, may exceed 27 Khz, 28 Khz, 29 Khz and the like.

The proximity sensing may include transmitting signals (ultrasonic signals and/or acoustic signals), and analyzing the signals captured by one or more sensors—such as one or more microphones.

The analyzing may include using signal processing methods, or classification methods (e.g. neural network), or a combination of these.

The analyzing may also be responsive to the transmitted signals.

The transmitted signals may have an energy spread across some frequency band, either continuously or in some finite set of frequency values.

The transmission may include different iterations that may use signals of different properties—such as different strength. For example, a dual iteration scheme may include (i) transmitting high amplitude/energy signals to detect proximity in a larger distance, and (ii) transmitting lower amplitude/energy signals when this large distance proximity is detected.

The analyzing may include processing signals from different sensors.

The multiple sensors may include the one or more sensors that receive ultrasonic and/or acoustic signal and may include other types of sensors. For example—signals from at least one additional sensor may also be taken into account—the at least one additional sensor may be an accelerometer, a gyroscope, a touch screen panel, a camera, ambient light sensor, etc. The signals of these sensors may carry information relevant for proximity sensing, for example a motion of moving a phone close to the ear. The signals of the additional sensors may be processed using signal processing methods, or a neural network, or both.

The analysis may take into account the position of the mobile phone—and may distinguish between different positions: e.g. phone placed on a table facing upwards or downwards, phone held in hand, etc.

Audible Artifacts

The transmitted signals (ultrasonic signals and/or acoustic signals) may have a form of a sine tone, either time modulated (e.g. pulses) or frequency modulated (e.g. FMCW).

When the transmitted signal are ultrasonic signals such signals may produce audible artifacts.

The audible artifacts may be reduced or mitigated by at least one out of (i) reducing a total amplitude of the transmitted signals, and (ii) spreading the energy of the transmitted signal across some frequency band, either continuously or in some finite set of frequency values. Reducing the transmitted amplitude reduces also the amplitude of the artifacts making them less audible and spreading the energy across some energy band allows to reduce the peak amplitude preserving the same RMS value. An example of such a signal may be white noise band limited to the desired frequency range.

Limited Range

Reducing the amplitude of the transmitted signals, to prevent audible artifacts, has the downside of a reduced operation range (distance). When an object is at a higher distance from the transmitter and the receiver, the acoustic waves reflected by it are more attenuated due to natural fading of acoustic waves emitted by a small source. Thus, to get the required signal strength at the receiver (microphone) with a more distant reflecting object, the transmitted signal should be stronger (higher amplitude).

The range limitation may be at least partially overcome by performing the mentioned above iterative process in which different iterations use signals of different properties—such as different strength At first stage, when no proximity is detected, stronger (higher amplitude) signal is used to detect proximity at a longer distance, at which the produced audio artifacts are not heard because the user's distance from the transmitter is large. The signals can be a modulated sine tone, or the spread frequency signal. Once an object is detected, the user's ear may be closer to the transmitter, thus the signal changes to a weaker one, lower by e.g. 12 dB, 18 dB, 24 dB, or any other value, which does not produce any audible artifacts.

This procedure can be split to more than two iterations, each with some reduction in the transmitted amplitude/energy.

Physical Signal Limitations

The use of the acoustic signals/ultrasonic signals may be influenced by the acoustic properties of the close object that needs to be detected, by environmental sounds (noises), and conditions, like dust covering the microphone.

In addition, the transmitted signals may not be sufficient for the required response time, accuracy and stability of detection.

In order to increase accuracy and overcome environment effects—the analysis may take into account signals from other types of sensors that may provide information about the environment, status of the mobile phone, and the like.

The analysis may involve taking into account signals of one or more additional sensors, to reduce the response time, and/or increase stability, accuracy, and robustness to acoustic properties of objects and environmental conditions. Proximity sensing may be interpreted as a statistical problem of estimating the probability of the presence of a close object. Different sensors, which may be insufficient by themselves for detecting proximity, may provide statistical information helping the algorithm to make the decision. Using this information may increase accuracy, reduce the response time, etc.

The signals of any combination of sensors (acoustic, ultrasonic and additional sensors) can be used for all the mentioned purposes, or any combination of them. For example, a motion like raising the phone to the ear increases the probability of a close object. Another example for this is an occluded light sensor which indicates darkness, increasing the probability of a close object that occludes it. Using these sensors together allows even better estimation.

The analysis may include the following stages:

a. Inferring a separate decision using each one of the sensors followed by some logic combining these to one final decision.

b. Pre-processing every sensor signal separately and passing all (or at least some) of them to one classifier that make a decision based on the passed pre-processed signals. Every sensor may require a different feature extraction, and the features extracted from all the sensors may be fed into a single classifier.

FIG. 1 illustrates method 100 for proximity sensing by a computerized device.

Method 100 may start by step 110 of transmitting, by at least one transmitter of a computerized device and during at least one transmission window, one or more transmitted signals, the one or more transmitted signals comprise a transmitted ultrasonic signal.

Step 110 may be followed by step 120 of operating at least one receiver of the computerized device to receive, during at least one reception window, one or more received signals that were reflected or scattered due to the transmitting.

Step 120 may be followed by step 130 of processing the received signals to provide a processing result, when receiving the received signals by the receiver during the at least one reception window.

Step 130 may be followed by step 140 of determining a proximity of one or more objects to the computerized device based on at least one out of (a) an absence of received signals during the at least one receive window, and (b) the processing results.

Method 100 may also include step 105 of determining a transmission and/or reception parameter to be applied during a next transmission and/or reception window. Step 105 may precede step 140, may be followed by step 110.

The at least one transmission window may include multiple (two, three or more than three) transmission windows, and wherein the at least one reception window may include multiple reception windows.

Accordingly—there may be multiple iterations of steps 110-140.

For example—one or more iterations of step 110 may include transmitting during at least three different transmission windows at least three transmitted ultrasonic signals that differ from each other; wherein the at least three different transmission windows belong to the multiple transmission windows.

Different iterations of steps 110-140 may be applied to cover different distance ranges from the computerized device.

Different iterations of steps 110-140 may differ from each other by transmissions and/or reception parameters.

The transmission parameters may determine one or more parameters of the transmitted signals, for example strength, duration, frequency range, type of transmitted signal, phase modulation, and the like.

Transmitted signals that are transmitted during different transmission windows may significantly differ from each other or may be the same.

One or more iterations of step 110 may include transmitting during a first transmission window a first transmitted ultrasonic signal and transmitting during a second transmission window a second transmitted ultrasonic signal.

The first transmitted ultrasonic signal significantly may differ from the second transmitted ultrasonic signal.

The first transmitted ultrasonic signal significantly may differ by strength from the second transmitted ultrasonic signal.

The first transmission window may precede the second transmission window. Step 105 may include determining a strength of the second transmitted ultrasonic signal based on an outcome of a proximity determination associated with the transmission of the first transmitted ultrasonic signal.

Step 105 may include determining the strength of the second transmitted ultrasonic signal to be significantly lower than that a strength of the first transmitted ultrasonic signal, when determining, based on processing results related to the first reception period, that an object is proximate to the computerized device.

One or more iterations of step 110 may include transmitting transmitted signals that include different types of transmitted signals. One or more iterations of steps 120 may include receiving different types of received signals.

The different types of transmitted signals and the different types of received signals may include at least one non-ultrasonic type of signal.

In this case step 130 may include:
- a. Applying the same process on different types of received signals.
- b. Applying different processing on the different types of received signals.
- c. Applying different neural networks on the different types of received signals.
- d. Inferring a separate proximity decision for each of the multiple sensors; and determining the proximity based in the separate proximity decisions.

- e. Pre-processing received signals that were sensed by different sensors and providing at least some of the pre-processed signals to a classifier for determining the proximity.

FIG. 2 illustrates a computerized device 200 that includes at least one transmitter 210, at least one receiver 220, and at least one processing circuit 230.

The at least one transmitter is configured to transmit during at least one transmission window, one or more transmitted signals (such as transmitted ultrasonic signal 251), the one or more transmitted signals comprise a transmitted ultrasonic signal.

The at least one receiver is configured to receive, during at least one reception window, one or more received signals (such as received ultrasonic echo 252) that were reflected or scattered due to the transmitting from object 255.

The at least one processing circuit is configured to (i) process the received signals to provide a processing result, when receiving the received signals by the receiver during the at least one reception window; and (ii) determine a proximity of one or more objects to the computerized device based on at least one out of (a) an absence of received signals during the at least one receive window, and (b) the processing results.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. The integrated circuit may be a system on chip, a general-purpose processor, a signal processor, an FPGA, a neural network integrated circuit, and the like.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for proximity sensing by a computerized device, the method comprising:

transmitting, by at least one transmitter of the computerized device, a first transmitted ultrasonic signal and a second transmitted ultrasonic signal, wherein the first transmitted ultrasonic signal is transmitted during a first transmission window, wherein the second transmitted ultrasonic signal is transmitted during a second transmission window that follows the first transmission window;

operating at least one receiver of the computerized device during a first reception window related to the first transmission window to receive any reflected ultrasonic signals that were reflected by one or more objects;

determining an absence or presence of the one or more objects proximate to the at least one transmitter based on at least one of (a) an absence of reflected ultrasonic signals received by the at least one receiver during the first reception window, and (b) reflected ultrasonic signals received by the at least one receiver during the first reception window; and setting a strength of the second transmitted ultrasonic signal transmitted during the second transmission window based on the absence or presence of the one or more objects, wherein the strength of the second transmitted ultrasonic signal is set to be lower than a strength of the first transmitted ultrasonic signal transmitted during the first transmission window in response to a determination of the presence of the one or more objects based on the reflected ultrasonic signals received by the at least one receiver during the first reception window, and the strength of the second transmitted ultrasonic signal is set to exceed the strength of the first transmitted ultrasonic signal transmitted during the first transmission window in response to a determination of the absence of the one or more objects based on the absence of reflected ultrasonic signals received during the first reception window.

2. The method according to claim 1 wherein the strength of the second transmitted ultrasonic signal is set to be lower than the strength of the first transmitted ultrasonic signal by at least 24 dB.

3. The method according to claim 1, wherein the strength of the second transmitted ultrasonic signal is set to be lower than the strength of the first transmitted ultrasonic signal by at least 12 dB.

4. The method according to claim 1, further comprising determining a sensitivity of the determining of the absence or presence of the one or more objects, wherein the determining of the sensitivity is based on a position of the computerized device.

5. The method according to claim 1, further comprising determining a sensitivity of the determining of the absence or presence of the one or more objects, wherein the determining of the sensitivity is based on an orientation of the computerized device.

6. The method according to claim 1, comprising determining a sensitivity of the determining of the absence or presence of the one or more objects, wherein the determining of the sensitivity is based on an identity of an application executed by computerized device.

7. The method according to claim 1, wherein the computerized device is a smartphone; and wherein the method comprises (a) determining whether the smartphone is hand held or is placed on a table facing upwards; and (b) increasing a sensitivity of the determining of the absence or presence of the one or more objects when determining that the smartphone is hand held.

8. The method according to claim 1, wherein the first transmitted ultrasonic signal is a white noise limited to a predefined frequency band.

9. The method according to claim 1, further comprising receiving one or more signals from at least one non-ultrasonic sensor, wherein the determining the absence or presence of the one or more objects proximate to the at least one transmitter comprises inferring a separate proximity decision for each of the at least one non-ultrasonic sensor and the at least one receiver; and determining the absence or presence of the one or more objects based on the separate proximity decisions.

10. The method according to claim 1, further comprising receiving one or more signals from at least one non-ultrasonic sensor, wherein the determining the absence or presence of the one or more objects proximate to the at least one transmitter comprises pre-processing the one or more signals received by the at least one non-ultrasonic sensor and the one or more received signals received by the at least one receiver and providing at least some of the pre-processed signals to a classifier for determining the the absence or presence of the one or more objects.

11. A non-transitory computer readable medium that stores instructions that once executed by a computerized device cause the computerized device to:

transmit, by at least one transmitter of the computerized device, a first transmitted ultrasonic signal and a second transmitted ultrasonic signal, wherein the first transmitted ultrasonic signal is transmitted during a first transmission window, wherein the second transmitted ultrasonic signal is transmitted during a second transmission window that follows the first transmission window;

operate at least one receiver of the computerized device during a first reception window related to the first transmission window to receive any reflected ultrasonic signals that were reflected by one or more objects;

determine an absence or presence of the one or more objects proximate to the at least one transmitter based on at least one of (a) an absence of reflected ultrasonic signals received by the at least one receiver during the first reception window, and (b) reflected ultrasonic signals received by the at least one receiver during the first reception window; and set a strength of the second transmitted ultrasonic signal transmitted during the second transmission window based on the absence or presence of the one or more objects, wherein the strength of the second transmitted 15 ultrasonic signal is set to be lower than a strength of the first transmitted ultrasonic signal transmitted during the first transmission window in response to a determination of the presence of the one or more objects based on the reflected ultrasonic signals received by the at least one receiver during the first reception window, and the strength of the second transmitted ultrasonic signal is set to exceed the strength of the first transmitted ultrasonic signal transmitted during the first transmission window in response to a determination of the absence of the one or more objects based on the absence of reflected ultrasonic signals received during the first reception window.

12. A computerized device having proximity sensing capabilities, the computerized device comprises at least one transmitter, at least one receiver, and at least one processing circuit;

wherein the at least one transmitter is configured to transmit a first transmitted ultrasonic signal and a second transmitted ultrasonic signal, wherein the first transmitted ultrasonic signal is transmitted during a first transmission window, wherein the second transmitted ultrasonic signal is transmitted during a second transmission window that follows the first transmission window; wherein the at least one receiver is configured to operate during a first reception window related to the first transmission window to receive any reflected ultrasonic signals that were reflected by one or more objects;

wherein the at least one processing circuit is configured to:

determine an absence or presence of the one or more objects proximate to the at least one transmitter based on at least one of (a) an absence of reflected ultrasonic signals received by the at least one receiver during the first reception window, and (b) reflected ultrasonic signals received by the at least one receiver during the first reception window; and set a strength of the second transmitted ultrasonic signal transmitted during the second transmission window based on the absence or presence of the one or more objects, wherein the strength of the second transmitted ultrasonic signal is set to be lower than a strength of the first transmitted ultrasonic signal transmitted during the first transmission window in response to a determination of the presence of the one or more objects based on the reflected ultrasonic signals received by the at least one receiver during the first reception window, and the strength of the second transmitted ultrasonic signal is set to exceed the strength of the first transmitted ultrasonic signal transmitted during the first transmission window in response to a determination of the absence of the one or more objects based on the absence of reflected ultrasonic signals received during the first reception window.

13. The computerized device according to claim 12, wherein the at least one processing circuit is configured to set a sensitivity of the determining of the absence or presence of the one or more objects, wherein the determining of the sensitivity is based on a position of the computerized device.

14. The computerized device according to claim 13, wherein the at least one processing circuit is configured to determine the sensitivity based on an orientation of the computerized device.

* * * * *